United States Patent [19]

Morell et al.

[11] 3,815,847

[45] June 11, 1974

[54] RECORDING OR REPRODUCING APPARATUS

[75] Inventors: Josef Morell; Johann Nowak; Josef Schild, all of Vienna; Harald Wessner, Neunkirchen, all of Austria

[73] Assignees: Karl Vockenhuber; Raimund Hauser, both of Vienna, Austria

[22] Filed: Dec. 13, 1972

[21] Appl. No.: 314,676

[30] Foreign Application Priority Data

Dec. 15, 1971 Austria ............................ 10745/71

[52] U.S. Cl. ................................ 242/191, 274/4 D

[51] Int. Cl. ... B65h 59/38, G03b 1/02, G11b 15/13

[58] Field of Search .................... 242/191, 201–204, 242/206, 208–210; 274/4 D, 11 D

*Primary Examiner*—Leonard D. Christian

[57] ABSTRACT

A strip handling apparatus which comprises a drive, a device for receiving a supply reel having a coil of strip and a device for receiving a take-up reel for the strip. The device for receiving a take-up reel is coupled to the drive, whereas the device for receiving a supply reel is freewheeling and receives torque only by means of the strip. A detecting device is operatively connected with the device for receiving a supply reel and the device for receiving a take-up reel to find out the faster rotating one. The detecting device has a first and second position, in the first position of the detecting device the speed of the freewheeling device for receiving a supply reel is larger than the speed of the device for receiving a take-up reel, in the second position of the detecting device the speed of the device for receiving a take-up reel being larger than the speed of the freewheeling device. A torque reducing device is provided at least for the device for receiving a supply reel and having an operative and an inoperative position. The torque reducing device is controlled by the detecting device in the first position of the detecting device the torque reducing means being in the operative position, in the second position of the detecting means the torque reducing device being in the inoperative position.

9 Claims, 8 Drawing Figures

RECORDING OR REPRODUCING APPARATUS

Figure 1:
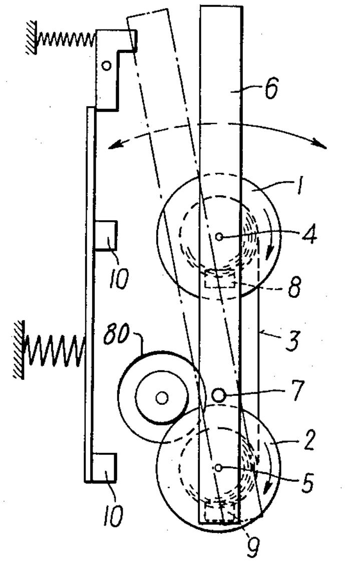

The invention relates to a recording- or reproducing apparatus provided with drive means for reels mountable on the equipment and wound with an information carrier, whereby upon rewinding of the information carrier from one reel to the other, the respective reel is connected with the drive means, whereas the other reel is freewheeling, being however brakable.

At the reproduction of informations recorded on tapes it is known to switch off the drive at the end of rewinding. Upon quick rewind of the coil from the freewheeling reel to a driven reel, the rate or revolutions of the reel supplying the tape grows constantly larger with decreasing coil diameter. If upon reaching the desired point both reels are suddenly braked, heavy stresses occur on the tape, so that at particularly large moments caused by large coil diameters, the tape may be damaged.

In common apparatus the arrangement provided for braking the freewheeling reel is operated by a centrifugal governor in dependence on the rate of revolutions of the reel. As however upon quick rewind the angular velocity of the freewheeling reel is very small, there occurs the disadvantage with centrifugal governors that the feed pathes of the centrifugal weights, which cause the switching operation of the brake, are likewise very small. The moment for actuating the braking device in dependence on the rewound coil material is rather bad to determine.

According to the invention it is therefore suggested with an equipment of the kind mentioned above that means be provided for detecting a difference of revolution rates in the range of the reels or in the range of a gear portion connected with the same, which are connected with at least one brake for actuating the same with the gear portion connected with the freewheeling reel rotating faster than the gear portion connected with the driven reel. The advantage thereof is that the moment of actuation of the brake is exactly defined. Expediently, the arrangement for detecting a difference of revolution rates upon finding a certain point in the rewound tape coil will actuate the brake at a difference of revolution rates already at a point being in a certain distance from the point to be found. The two reels could then be braked gradually in order to come finally to a standstill upon reaching the desired point of recording, whereby nearly no stresses occur on the tape.

According to the invention a number of embodiments are possible. An advantageous improvement of the invention consists in disposing the two reels coaxially, whereby the arrangement detecting the difference of revolution rates is located between the two coaxial reels or between the gear portions connected with the same, being at the same time connected with the drive means.

Generally there is little space left for the reels in the range of their mounting and the drive means. According to a further advanced embodiment of the invention it is suggested that the arrangement for detecting the difference of revolution rates be formed by a pulse generator connected with the freewheeling reel and by an electronic comparator, the pulses of which are fed together with the pulses of a second pulse generator connected with the drive means, to the electronic comparator, whereby the brake is controlled by the electronic comparator. The pulse generator could for instance be designed as a perforated disk arranged between a light source and a photoelectric cell being connected with the freewheeling reel. Instead of a perforated disk also a collector disk with grooves could be used, whereby the pulses are now scanned by sliders.

A further application of the inventive arrangement consists in braking the reels at the end of the rewind procedure. Here it must be considered that the reel supplying the tape be not braked by large coil diameters before the whole tape coil is wound up on the driven reel.

An especially space saving arrangement for braking the freewheeling reel is an advantageous embodiment of the invention, in which the braking device is coupled with the drive for the driven reel, when the gear portion connected with the freewheeling reel rotates faster than the gear portion connected with the driven reel.

Further features and details of the invention will become apparent from the specification of the embodiments schematically illustrated in the drawing.

Figure 1A:
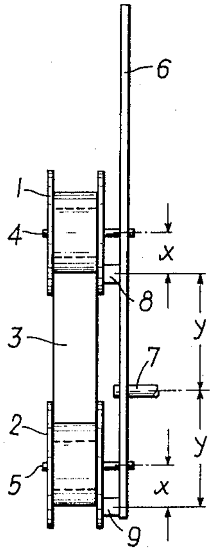

FIGS. 1, 1*a* are views which show schematically a possible design of the supply- and the take-up reel with an inventive arrangement for detecting a difference of revolution rates.

Figure 2:
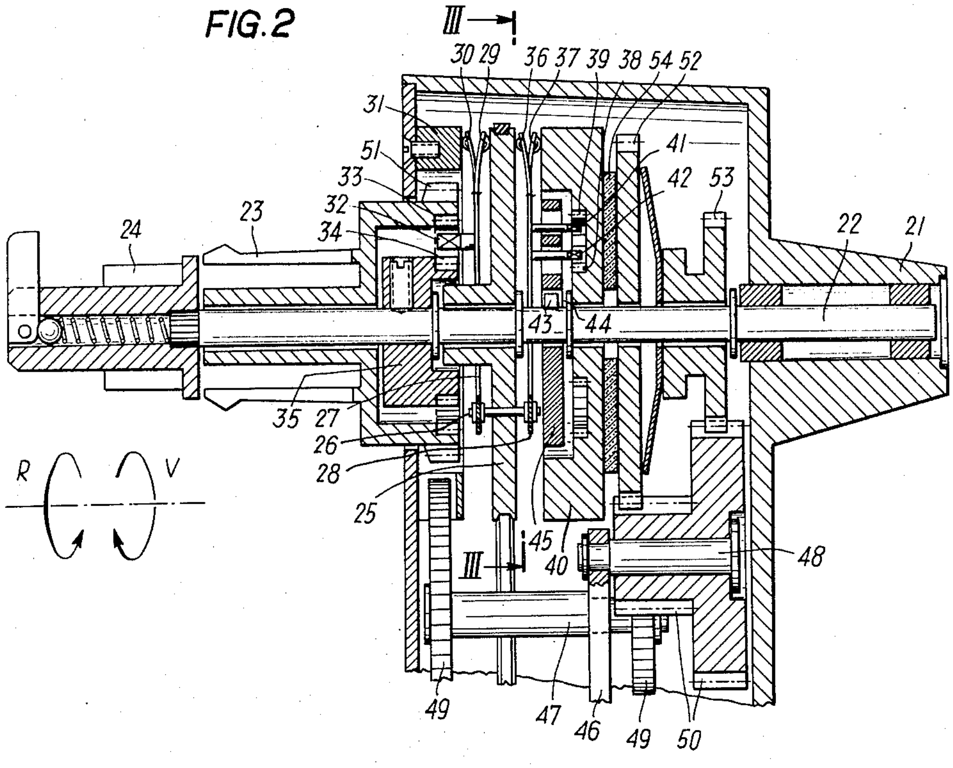

FIG. 2 is a view which shows a further embodiment of the invention, whereby the arrangement of the reels is chosen coaxially.

Figure 3A:
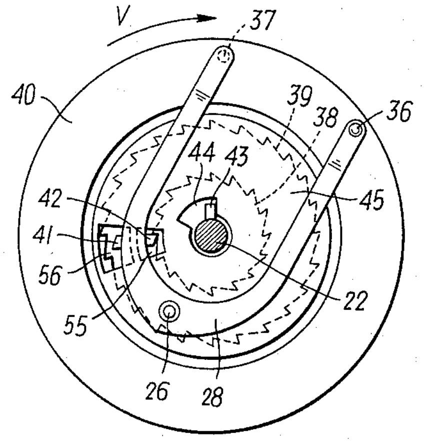
Figure 3B:
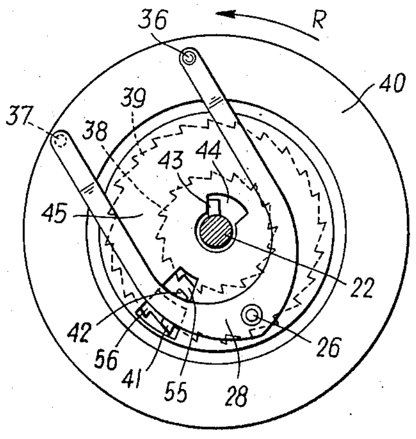

FIGS. 3*a* and 3*b* is a section according to line III—III of FIG. 2, whereby the FIG. 3*a* shows an arrangement for detecting a difference of revolution rates in quick forward drive, the FIG. 3*b* the position of the arrangement in quick rewind.

Figures 4, 4A:
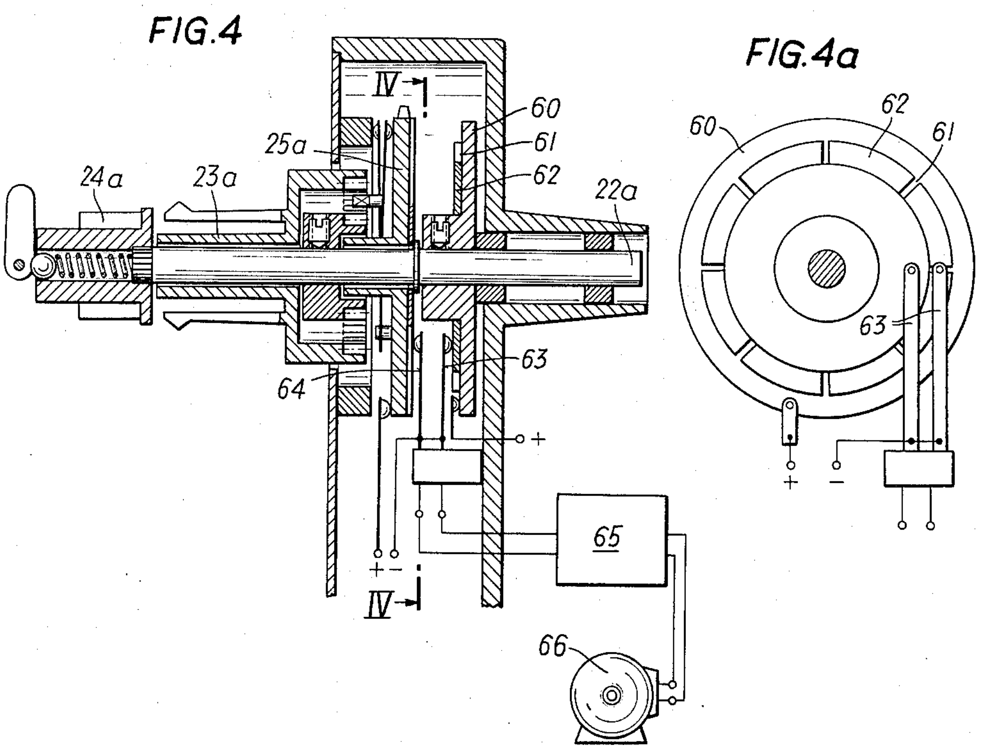

In the FIGS. 4, 4*a* a further embodiment of the invention is illustrated.

Figure 5:
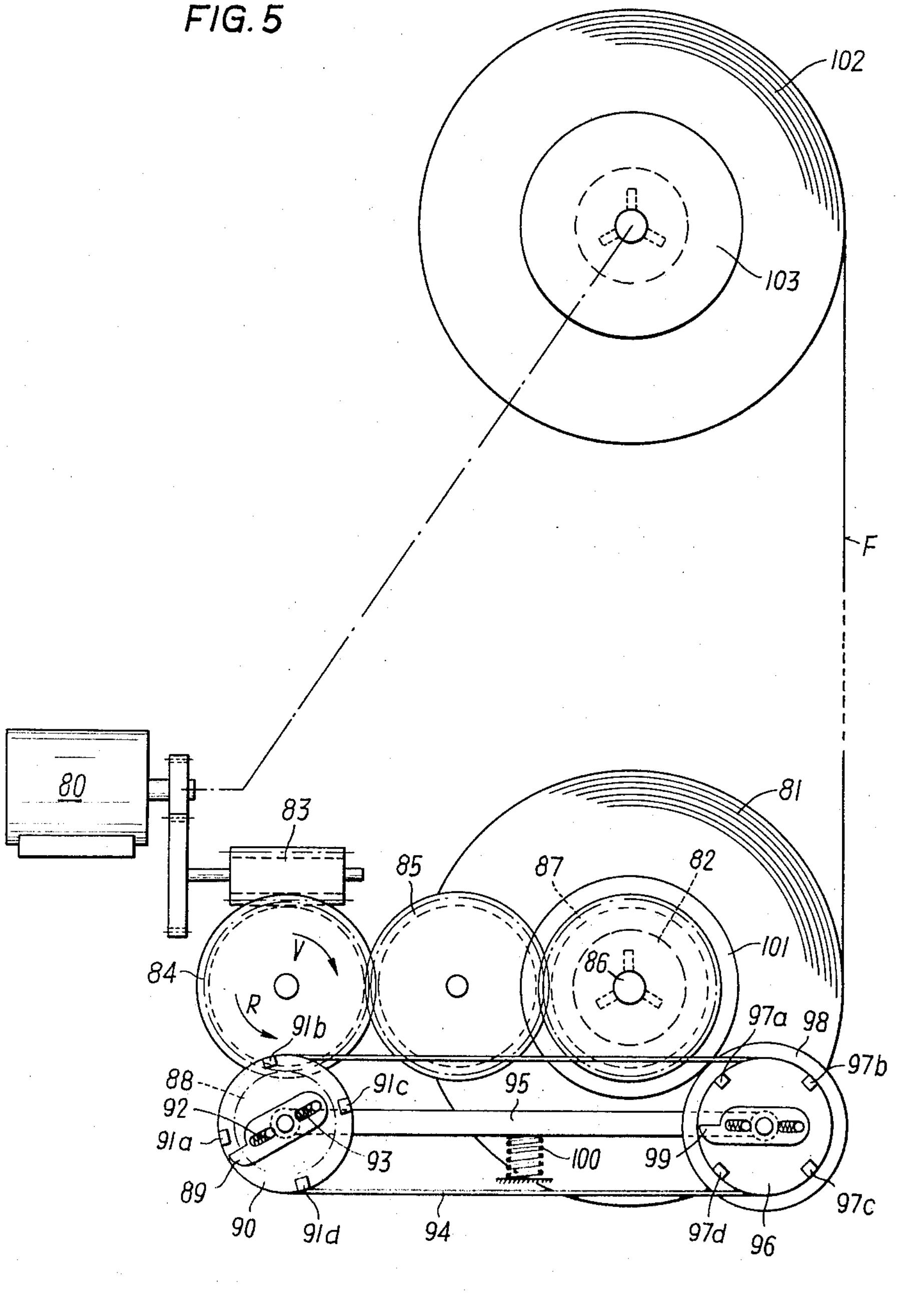

Another embodiment of the invention is shown in FIG. 5.

FIGS. 1, 1*a* show an inventive arrangement of the reels 1, 2 disposed parallel to each other. It may be assumed that the reel 2 is driven by a shaft 5 operatively connected with drive means 80, whereby a tape 3 being rewound from reel 1 to reel 2 takes along the reel 1 freewheeling about an axis 4. A lever 6 is pivotally arranged about an axis 7 located between the two axes 4, 5 and bears two pads 8, 9 being in friction contact with each of the reels. The pad 8, as well as the pad 9, abuts the reel flange in a radial distance $x$ from the respective axis of rotation of the reel, whereby the distance $y$ of the two pads 8, 9 from the axis of rotation 7 of the lever 6 is likewise equally large.

At the start of the rewind procedure, when the whole coil is wound up on the reel 1, the reel 2 driven with a constant revolution rate will, according to the known laws of mechanics, rotate faster than the freewheeling reel 1. According to the formula $M_r = P \cdot \mu \cdot y$, wherein $M_r$ means the moment of the lever 6 in the distance $y$ from the center of rotation 7, P the bearing force of the pads 8 or 9 and $\mu$ the friction factor, it follows that at variable revolution rates $n$ of the reels 1, 2 the moment causing the deviation of the lever 6 is $A_n = \pi \cdot n \cdot M_r/30$ whereby ($n_1 > n_2 \rightarrow A_{n1} > A_{n2}$). Applied to FIG. 1 that means that the lever 6 is deviated in clockwise sense (full arrow). In the half of the rewind procedure the coil diameters on the two reels 1, 2 are equally large, the lever 6 takes the position drawn in FIG. 1. If the coil diameter on the reel 1 is smaller than that on the reel 2, the lever 6 deviates in counterclockwise sense about an axis 7 (dash-lined arrow) and actuates a brake 10 at a pre-established angle position corresponding to a determined coil diameter.

FIG. 2 illustrates a section across a reel arm 21 pivotally attached to a film projector. Means for receiving a reel, e.g. a spindle 23 are pivoted about an axis 22 supported by the reel arm 21, a further spindle is rigidly fixed to the axis 22. The two spindles 23, 24 are driven by a belt pulley 25 supported by the axis 22, secured against axial shifting and coupled with the drive means. This belt pulley 25 bears an axis 26 parallel to the axis 22, jutting on both sides its flanges. Clutch means formed by two similar spring leaves, axially opposed on each side of the belt pulley 25, are pivotally arranged about the axis 26. These ring-shaped spring leaves 27 and 28 respectively, are slotted opposite the bearing of the axis of rotation 26, whereby both of the free ends are turned up axially opposed, each of which ends bears a slider.

The spring leaf 27 is supported by the flange of the belt pulley 25 facing the two spindles, whereby a slider 29 is in friction contact with the flange itself and a slider 30 is in friction contact with a ring 31 fixed to the reel arm. Further the spring leaf 29 bears a clutch-pawl 32, which upon deviation of the spring leaf 27 comes into engagement either with an internal toothing 33 or with an external toothing 34 for transmitting the torque to the means for receiving a reel e.g. a spindle 23, 24. The internal toothing 33 is connected with the spindle 23 and a part 35 bearing the external toothing 34 is connected with the spindle 24 by means of the axis 22.

The spring leaf 28 on the flange of the belt pulley 25 lying axially opposed to the bearing of the spring leaf 27 is pivotally arranged about an axis 26, whereby again a slider 36 is in friction contact with the flange of the belt pulley 25, a slider 37 in friction contact with a part 40 bearing an internal toothing 39 and an external toothing 38 radially opposed to said internal toothing 39. The spring leaf 28 shows two clutch-pawls 41, 42, which are assigned to each toothing of the part 40. The angle of avertance of the spring leaf 28 about the axis 26 is confined by a stop 45 coupled with the axis 22 over a wedge-groove-guide 43, 44.

A lever 46 is pivotally arranged about an axis, not shown, in such a manner that one respective pair of gear wheels 49, 50 fixed to the axes 47, 48, supported by the lever 46, can be brought into operative position. The pair of gear wheels 49 meshes in operative position with an external toothing 51 of the spindle 23, respectively with a gear wheel 52 pivotally arranged on the axis 22, whereas the other pair 50 is in inoperative position. In the other case the pair of gear wheels 50 comes into engagement with the gear wheel 52, respectively with a gear wheel 53 fixed to the axis 22. When the spindle 23 is charged with the supply reel, the pair of gear wheels 50 is in operative position, when the spindle 24 bears the supply reel, the pair of gear wheels 49 is in operative position. The gear wheel 52 is spring-biased in the direction of a friction disk 54 arranged between the part 40 and the gear wheel 52.

If the spindle 24 bears the supply reel, the torque is transmitted to the spindle 23 in the direction of the arrow V, as the slider 29 sliding on the driven belt pulley 25 causes with respect to the slider sliding on the stillstanding ring 31 a deviation of the spring leaf 27 in the direction of the arrow V, so that the clutch-pawl 32 engages the internal toothing 33 of the spindle 23. The spindle 23 bears an empty reel, on which one tape end is fixed, so that the torque is transmitted by means of the tape to the slowly starting supply reel. The transmission of the force is effected over the axis 22, the gear wheels 53, 50 and 52, and over the friction disk 54 to the part 40, whereby now the torque of the belt pulley 25 over the slider 36 is compared with the increasing torque of the part 40 over the slider 37, due to the increase of the rewound coil.

In FIG. 3*a* the mode of operation of the detecting arrangement to determine the faster rotating torque transmitting means is illustrated. At the start of the rewind procedure in forward direction, the wedge 43 strikes the right end of the groove 44 (related to the figure) and takes along the stop 45 showing two recesses 55 and 56. As first the torque of the belt pulley 25 is larger than the torsional moment of the part 40, the slider 36 causes a deviation of the leaf 28 to the left (related to FIG. 3*a*) until the clutch-pawl 42 strikes the recess 55, whereby the clutch-pawl 41 is not in mesh with the internal toothing 39.

Upon increasing coil diameter of the tape reel mounted on the spindle 24, also the spring leaf 28 deviates to the right, until the clutch-pawl 42 comes into engagement with the external toothing 38, so that the part 40 is directly connected with the drive means. By means of the friction disk 54 acting as brake the torsional moment of the freewheeling reel is decreased.

When the supply reel is mounted on the spindle 23, the drive is effected over the belt pulley 25 in the direction of the arrow R. Now the clutch-pawl 32 of the spring leaf 27 is in mesh with the external toothing 34, the torque is transmitted to the spindle 24 bearing the empty reel. The spindle 23 is freewheeling, whereby the lever 46 keeps the pair of gear wheels 49 in operative position. The torque of the freewheeling reel is transmitted by the gear 51, 49, 52 over the friction disk 54 to the part 40. The clutch-pawls 41, 42 of the spring leaf 28 take first — because of the higher revolution rate of the belt pulley with respect to the part 40 — the position illustrated in FIG. 3*a* in broken line. As now the drive takes place in reversed direction, the wedge 43 connected with the axis 22 strokes the left end of the groove 44 (related to FIG. 3*b*). At the start of the arrangement, the clutch-pawl 41 abuts the recess 56, whereby the pawl 42 is not in mesh with the external toothing 38. Upon a higher revolution rate of the part 40 with respect to the revolution rate of the belt pulley 25, the spring leaf 28 deviates to the left (related to FIG. 3*b*), the clutch-pawl 41 meshes with the toothing 39 and the procedure set forth above is repeated, whereby now the friction disk 54 brakes the torsional moment of the reel mounted on the spindle 23.

In FIG. 4 a further embodiment of the detecting arrangement to determine the faster rotating torque transmitting means is schematically displayed. For the sake of simplicity the illustration of an arrangement in which the supply reel may also be mounted on the spindle 23*a*, whereby the two revolution rates at rewind operation are compared, has been abandoned. In many projectors an inventive arrangement is only necessary at quick rewind in forward direction, as the film is then also threaded in the film gate. After locating the desired scene, a projection may immediately take place. In the new cartridge projectors the film is certainly also at quick rewind in the film gate. In that way there is given the possibility for quick rewind at the repetition of scenes recorded at the beginning of the tape, whereby the detecting arrangement to determine the faster rotating torque transmitting means is also connected with the second reel arm, in order to prevent an abnormal threading out of the tape (see for instance the arrangement according to FIG. 2).

The arrangement for the drive of the two spindles 23*a* and 24*a* works in the same way, as illustrated in FIG. 2 and its mode of operation needs therefore not be further explained. Instead of the part 40 bearing the toothings 38, 39, respectively the spring leaf 28, a disk 60 is here provided, which is fixed to the axis 22*a*. A collector disk 62 provided with grooves 61 is connected with this disk (FIG. 4*a*). Axially opposed to this disk 62, a driving pulley 25*a* is pivotally arranged about the axis 22*a*, which driving pulley 25*a* shows likewise collector grooves, preferably the same number of grooves as provided on the disk 62. Two slider pairs 63 and 64 fixed to the equipment are in friction contact with the respective disks 25*a* or 62 respectively, which are connected to a voltage source. Upon rotation of the two disks 25*a*, 62, pulses are supplied from the sliders 63, 64 to an electronic comparator 65, which controls a reel driving motor 66. The reel driving motor 66 reduces its torque, when the collector disk 62 rotates faster than the belt pulley 25*a*, that is when the pulse frequency generated by the pair of sliders 63 is larger than that generated by the slider pair 64. The torque of the belt pulley 25*a* is decreased or it is completely brought to standstill just according to the design of the control.

The FIG. 5 shows a further embodiment of the invention, which serves to prevent the formation of loose tape loops on the freewheeling reel, after braking the same. A reel 81 is driven by a driving motor 80 by means of a coupling 82 transmitting the torsional moment in forward run in the direction of the arrow V. Said coupling is not shown in detail. The transmission gear consists substantially of a worm 83, a worm wheel 84, a gear wheel 85 and of a gear wheel 87 fixed to the axis of the reel 86.

A further gear wheel 88 is in mesh with the worm wheel 84 and transmits the torsional moment to the clutch-pawl 89, which is shiftable in radial direction on a flange of a belt pulley 90 showing teeth 91*a* to *d*. Springs 92, 93 keep the pawl 89 during its rotation in the range of the teeth 91*a* to *d*.

A belt 94 loops on the one hand the belt pulley 90, on the other hand a belt pulley 96 being likewise pivotally arranged on a lever 95 and bearing teeth 97*a* to *d* like the belt pulley 90. A rubber roller 98 is connected to a pawl 99, which is similar to the pawl 89 and is radially shiftable on the flange of the belt pulley 96 bearing teeth 96a to d.

When the gear wheel 88 is driven over the gear wheel 84 in the direction of the arrow V, the pawl 89 rotates likewise in forward direction and turns radially aside to the inside upon passing one of the teeth 91*a* to *d*.

When the motor 80 rotates in the direction of the arrow R, the reel 81 is disengaged from the drive means by means of the one-way coupling. It is freely driven over the tape F by means of another reel 102, which is now connected with the drive means over the coupling 103. Simultaneously the lever 95 bearing the belt pulleys 90, 96 and the friction roller 98 is deviated about the axis of rotation of the belt pulley 90, whereby the friction roller 98 comes into friction contact with a wheel 101 fixed to the reel axis 86 by the action of a spring 100.

The pawl 89 now driven in reversed direction of rotation by the gear wheel 88 comes into mesh with one of the teeth 91a to d and transmits the moment to the belt pulley 90, and by means of the belt 94 to the belt pulley 96. The rate of revolution of this belt pulley 96 is higher dimensioned than the highest revolution rate of the pawl 99 rotating in the same sense and driven by the freewheeling reel 81 over the wheel 101 and the friction wheel 98. That means that the teeth 97*a* to *d* always override the pawl 99 during rotation.

When the drive means are switched off, the driven reel 102 comes to standstill. Since however also the belt pulley 96 with the teeth 97*a* to *d* connected with the drive means 80 stands still, the pawl 99 driven by the inertia of the reel 81 strikes one of the teeth 97*a* to *d* and brakes the moment of the reel by means of the rubber roller 98.

It is evident that such an arrangement for braking the freewheeling reel 81 at driving direction of the motor 80 in the direction of the arrow R may also be assigned to the reel 102, if the motor 80 drives in the direction of the arrow V. In this mode of operation the reel 102 would then be freewheeling. For the sake of simplicity a detailed illustration of this braking arrangement with the pertinent couplings has been abandoned in FIG. 5, as it is likewise constructed as the arrangement of the reel 81.

What is claimed is:

1. A strip handling apparatus comprising a. drive means, b. means for receiving a supply reel having a coil of strip, and c. means for receiving a take-up reel for said strip, said means for receiving a take-up reel being rotatably coupled to said drive means whereas said means for receiving a supply reel are freewheeling and receive torque only by means of said strip, d. detecting means operatively connected with said means for receiving a supply reel and said means for receiving a take-up reel to determine the faster rotating reel, said detecting means having a first and second condition, in said first condition the speed of said freewheeling means for receiving a supply reel being larger than the speed of said means for receiving a take-up reel, in said second condition the speed of said means for receiving a take-up reel being larger than the speed of said freewheeling means, e. torque reducing means at least for said means for receiving a supply reel and having an operative and an inoperative condition, said torque reducing means being controlled by said detecting means, in said first condition of said detecting means said torque reducing means being in operative condition, in said second condition of said detecting means said torque reducing means being in said inoperative condition.

2. A strip handling apparatus comprising a. drive means having a forward operation mode and a reverse operation mode, b. means for receiving a supply reel having a coil of strip, and c. means for receiving a take-up reel for said strip, said drive means comprising aa. clutch means for rotatably coupling said drive means to said means for receiving the take-up reel, said clutch means having a first position in said forward operation mode and a second position in said reverse operation mode, ab. first torque transmitting means operatively connected to said means for receiving a supply reel and having a coupled and an uncoupled condition, in said second position of said clutch means said first torque transmitting means being in said coupled condition, ac. second torque transmitting means operatively connected to said means for receiving a take-up reel and having a coupled and uncoupled condition, in said first position of said clutch means said second torque transmitting means being in coupled condition, in the coupled condition torque being transmitted from said drive means to the means receiving actually the take-up reel via said clutch means whereas the means for receiving the supply reel and the actually uncoupled torque transmitting means are freewheeling and receive torque only by means of said strip via said means receiving actually the supply reel, d. detecting means operatively connected to said means for receiving a supply reel and said means for receiving a take-up reel via said first and second torque transmitting means to determine the faster rotating reel by determining the faster rotating torque transmitting means, said detecting means having a first and a second position, in said first position of said detecting means the speed of said freewheeling means being larger than the speed of said coupled means receiving torque from said drive means, in said second position of said detecting means the speed of said means for receiving a take-up reel being larger than the speed of said freewheeling means, e. torque reducing means at least for said means for receiving a supply reel via said first torque transmitting means in their uncoupled condition, said torque reducing means being controlled by said detecting means and having an operative and an inoperative position, in said first position of said detecting means said torque reducing means being in said operative condition, in said second position of said detecting means said torque reducing means being in said inoperative condition.

3. A strip handling apparatus comprising a. drive means having a forward operation mode and a reverse operation mode, b. means for receiving a supply reel having a coil of strip, and c. means for receiving a take-up reel for said strip, said drive means comprising aa. clutch means for rotatably coupling said drive means to said means for receiving the take-up reel, said clutch means having a first position in said forward operation mode and a second position in said reverse operation mode, ab. first torque transmitting means being operatively connected to said means for receiving a supply reel and having a coupled and an uncoupled condition, in said second position of said clutch means said first torque transmitting means being in said coupled condition, ac. second torque transmitting means being operative connected to said means for receiving a take-up reel and having a coupled and an uncoupled condition, said second torque transmitting means being pivotally mounted rotatable around a first axis, in said first position of said cutch means said second torque transmitting means being in said coupled condition, in the coupled condition torque being transmitted from said drive means to the means receiving actually the take-up reel via said clutch means whereas the means for receiving the supply reel and the actually uncoupled torque transmitting means are freewheeling and receive torque only by means of said strip via said means receiving actually the supply reel, d. detecting means operatively connected to said means for receiving a supply reel and said means for receiving a take-up reel via said first and second torque transmitting means to determine the faster rotating reel by determining the faster rotating torque transmitting means, said detecting means comprising da. at least first and second slider means being pivoted about a second axis which is parallel to said first axis, said first slider means contacting frictionally said first torque transmitting means, said second slider means contacting frictionally said second torque transmitting means, and db. operating means controlled by said first and second slider means and having a first position and a second position, in said first position of said operating means the speed of said freewheeling means being larger than the speed of said coupled means receiving torque from said drive means, in said second position of said operating means the speed of said coupled means being larger than the speed of said freewheeling, e. torque reducing means including braking means for braking at least said freewheeling means receiving actually the supply reel, said braking means having an operative and an inoperative condition and being controlled by the operating means of said detecting means, in said first position of said operating means said braking means being in said operative condition, in said position of said operating means said braking means being in said inoperative position.

4. A strip handling apparatus as set forth in claim 3 in which said first torque transmitting means is a supply reel and said second torque transmitting means is a take-up reel.

5. A strip handling apparatus as set forth in claim 3 in which said braking means being operatively connected with a toothed disk, said operating means comprising pawl means, said pawl means being engaged with said toothed disk depending on a pivotal movement about said second axis of said detecting means in a direction corresponding to the rotating direction of said uncoupled torque transmitting means.

6. A strip handling apparatus comprising a. drive means having a forward operation mode and a reverse operation mode, b. means for receiving a supply reel having a coil of strip, and c. means for receiving a take-up reel for said strip, said drive means comprising aa.. clutch means for rotatably coupling said drive means to said means for receiving the take-up reel, said clutch means having a first position in said forward operation mode and a second position in said reverse operation mode, ab. first torque transmitting means operatively connected to said means for receiving a supply reel and having a coupled and an uncoupled condition, in said second position of said clutch means said first torque transmitting means being in said coupled condition, ac. second torque transmitting means operatively connected with said means for receiving a take-up reel and having a coupled and an uncoupled condition, in said first position of said clutch means said second torque transmitting means being in said coupled condition, in the coupled condition torque is transmitted from said drive means to the means receiving actually the take-up reel via said clutch means whereas the means for receiving the supply reel and the actually uncoupled torque transmitting means are freewheeling and receive torque only by means of said strip, d. detecting means operatively connected said means for receiving a supply reel and said means for receiving a take-up reel via said first and second torque transmitting means to determine the faster rotating reel by determining the faster rotating torque transmitting means, said detecting means comprising da. first pulse generator means connected to said first torque transmitting means for emitting first output signals in dependence on their speed, db. second pulse generator means connected to said second torque transmitting means for emitting second output signals in dependence on their speed, dc. comparator means receiving said first and second output signals for comparison and having a first and a second condition, in said first position of said comparator means the speed of said freewheeling means being larger than the speed of said coupled means receiving torque from said drive means, in said second condition of said comparator means the speed of said coupled means being larger than the speed of said freewheeling means, e. torque reducing means at least for said means for receiving a supply reel by reducing the torque at least of said drive means, said torque reducing means being controlled by the comparator means of said detecting means and having an operative and an inoperative condition, in said first condition of said comparator means said torque reducing means being in said operative condition, in said second condition of said comparator means said torque reducing means being in said inoperative condition.

7. A strip handling apparatus comprising a. drive means having a forward operation mode and a reverse operation mode, b. means for receiving a supply reel having a coil of strip, and c. means for receiving a take-up reel for said strip, said drive means comprising, aa. first clutch means having a first position in said forward operation mode and a second condition in said reverse operation mode, ab. first torque transmitting means operatively connected to said means for receiving a supply reel and having a coupled and an uncoupled condition, in said second position of said first clutch means said first torque transmitting means being in said coupled condition, ac. second torque transmitting means operatively connected with said means for receiving a take-up reel and having a coupled and an uncoupled condition, in said first position of said first clutch means said second torque transmitting means being in said coupled condition, in the coupled condition torque is transmitted from said drive means to the means receiving actually the take-up reel via said clutch means whereas the means for receiving the supply reel and the actually uncoupled torque transmitting means are freewheeling and receive torque only by means of said strip, d. detecting means operatively connected to said means for receiving a supply reel and said means for receiving a take-up reel via the actually coupled torque transmitting means of said drive means and the actually uncoupled torque transmitting means to determine the faster rotating reel by determining the faster rotating torque transmitting means, said detecting means comprising, da. second clutch means having an operative and an inoperative position, in said operative position the speed of said freewheeling means being larger than the speed of said means for receiving a take-up reel coupled to said drive means, in said inoperative position the speed of said means for receiving a take-up reel coupled to said drive means being larger than the speed of said freewheeling means, e. torque reducing means including braking means for braking said means for receiving a supply reel by braking said uncoupled torque transmitting means, said braking means having an operative and an inoperative condition, in said operative position of said second clutch means said braking means being in operative condition, in said inoperative position of said second clutch means said braking means being in inoperative position.

8. A strip handling apparatus as set forth in claim 7 in which said braking means comprising a disk, said disk being frictionally in contact with said uncoupled torque transmitting means.

9. A strip handling apparatus as set forth in claim 7 in which said second clutch means comprising first and second coupling means, said first coupling means being connected to said braking means and comprising pawl means, said second coupling means being connected to said drive means and comprising a gear having at least one tooth.

* * * * *